(12) United States Patent
Wilkerson et al.

(10) Patent No.: US 10,465,736 B2
(45) Date of Patent: Nov. 5, 2019

(54) METHOD OF FASTENING STRUCTURES USING ANTI-ROTATION RIVETLESS NUT PLATE

(71) Applicant: The Boeing Company, Chicago, IL (US)

(72) Inventors: Jeffrey Alan Wilkerson, Everett, WA (US); Randy Allan Southmayd, Florissant, MO (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 15/622,867

(22) Filed: Jun. 14, 2017

(65) Prior Publication Data
US 2017/0284448 A1 Oct. 5, 2017

Related U.S. Application Data

(62) Division of application No. 13/848,135, filed on Mar. 21, 2013, now Pat. No. 9,719,547.

(51) Int. Cl.
*F16B 37/04* (2006.01)
*F16B 33/00* (2006.01)
*B21D 39/00* (2006.01)

(52) U.S. Cl.
CPC ............ *F16B 37/044* (2013.01); *B21D 39/00* (2013.01); *F16B 33/002* (2013.01); *Y10T 29/49948* (2015.01)

(58) Field of Classification Search
CPC ................. F16B 37/044; F16B 33/002; Y10T 29/49948; B21D 39/00
See application file for complete search history.

(56) References Cited

U.S. PATENT DOCUMENTS

| 289,379 | A | 12/1883 | Blighton |
| 1,705,463 | A | 3/1929 | Andren |
| 1,761,358 | A | 6/1930 | Mitchel |
| 1,872,616 | A | 8/1932 | Andren |
| 2,078,411 | A | 4/1937 | Richardson |
| 3,241,423 | A | 3/1966 | Davis |
| 3,443,617 | A | 5/1969 | Whiteside et al. |
| 3,698,278 | A | 10/1972 | Trembley |
| 3,765,078 | A | 10/1973 | Gulistan |
| 3,765,464 | A | 10/1973 | Hasegawa |

(Continued)

FOREIGN PATENT DOCUMENTS

| EP | 0186608 A1 | 7/1986 |
| EP | 0530132 A1 | 3/1993 |
| FR | 2936845 A1 | 4/2010 |

OTHER PUBLICATIONS

"U.S. Appl. No. 13/848,135, Advisory Action dated Oct. 28, 2016", 3 pages.

(Continued)

*Primary Examiner* — Jermie E Cozart
(74) *Attorney, Agent, or Firm* — Kwan & Olynick LLP (57) ABSTRACT

A method and apparatus for fastening structures. A first end of a body is placed into a hole on a first side of the structures. The body has an outer surface with a noncircular cross-section. A nut element is positioned on a flange at a second end of the body. A bolt is moved into a channel at the first end of the body towards the nut element on the flange on the second end of the body on the first side the structures. The bolt and the nut element are fastened to each other.

20 Claims, 10 Drawing Sheets

(56) References Cited

U.S. PATENT DOCUMENTS

| | | |
|---|---|---|
| 4,557,650 A | 12/1985 | Molina |
| 4,732,518 A | 3/1988 | Toosky |
| 5,006,025 A | 4/1991 | Duran |
| 5,037,259 A | 8/1991 | Duran et al. |
| 5,209,620 A | 5/1993 | Zare-Ardestani |
| 5,314,144 A | 5/1994 | Porter, Jr. et al. |
| 5,380,136 A | 1/1995 | Copple et al. |
| 5,405,228 A | 4/1995 | Reid et al. |
| 6,929,273 B2 | 8/2005 | Dobson et al. |
| 8,262,332 B2 | 9/2012 | Poppe et al. |
| 8,777,278 B2 | 7/2014 | Singh et al. |
| 8,876,066 B1 | 11/2014 | Richards |
| 9,719,547 B2 | 8/2017 | Wilkerson et al. |
| 2011/0150599 A1 | 6/2011 | Bakken et al. |
| 2014/0064873 A1 | 3/2014 | Kevin et al. |
| 2014/0283363 A1 | 9/2014 | Wilkerson et al. |

OTHER PUBLICATIONS

"U.S. Appl. No. 13/848,135, Examiner Interview Summary dated Dec. 19, 2016", 3 pages.

"U.S. Appl. No. 13/848,135, Examiner Interview Summary dated Dec. 28, 2016", 3 pages.

"U.S. Appl. No. 13/848,135, Final Office Action dated Aug. 16, 2016", 7 pages.

"U.S. Appl. No. 13/848,135, Final Office Action dated Nov. 10, 2015", 7 pages.

"U.S. Appl. No. 13/848,135, Non Final Office Action dated Jan. 20, 2017", 6 pages.

"U.S. Appl. No. 13/848,135, Non Final Office Action dated Mar. 22, 2016", 8 pages.

"U.S. Appl. No. 13/848,135, Non Final Office Action dated Jun. 5, 2015", 16 pages.

"U.S. Appl. No. 13/848,135, Restriction Requirement dated Mar. 3, 2015", 5 pages.

"U.S. Appl. No. 13/848,135, Notice of Allowance dated Mar. 20, 2017", 5 pages.

"Force Tec Rivetless Nut Plate Nutplate Aerospace FTI", Fatigue Technology, 2010, 4 pgs.

"International Application Serial No. PCT/US14/11493, International Search Report dated May 2, 2014", 11 pages.

"MS21078 Nutplates, Nylon Ins.", Genuine Aircraft Hardware Company, 1997-2013, 2 pgs.

"Standard MS 'Crimped Nut' Style", Lance Aircraft Supply, Inc, Feb. 25, 2013, 1 page.

METHOD OF FASTENING STRUCTURES USING ANTI-ROTATION RIVETLESS NUT PLATE

1. CROSS-REFERENCE TO RELATED APPLICATION

This application is a divisional of U.S. Provisional patent application Ser. No. 13/848,135, entitled: "Anti-Rotation Rivetless Nut Plate" filed on Mar. 21, 2013, which is incorporated herein by reference in its entirety for all purposes.

2. FIELD

The present disclosure relates generally to manufacturing and, in particular, to connecting structures to each other. Still more particularly, the present disclosure relates to a method and apparatus for connecting a stack up of structures to each other using a fastener system that includes a nut plate.

3. BACKGROUND

In manufacturing objects, structures are often connected to each other. For example, in manufacturing an object, such as an aircraft, many different structures are connected to each other to form assemblies for systems in the aircraft. For example, skin panels may be attached to ribs and spars. As another example, floor panels may be connected to support structures in a fuselage to form the floor of a passenger cabin.

In connecting the structures to each other, different types of connecting systems may be used. One type of connecting system is a fastener system. A fastener system may include one or more fasteners. For example, a fastener for a fastener system may be a screw. In another example, a fastener system may be a bolt and a nut.

These fasteners are used to connect structures to each other. Holes are then formed in the structure. Next, nuts and bolts are installed relative to the holes.

In some cases, access to both sides of the structure may not be feasible. For example, automated equipment may not be able to access both sides of the structure to install fasteners. As a result, a human operator or additional equipment may be used to install the fasteners. In some cases, the location of the structure may make access to the inside fastening elements impossible.

One manner in which fasteners may be installed involves using a nut plate. A nut plate may be installed relative to a hole. The nut plate is configured to prevent movement of the nut element when the bolt is rotated. The nut plate is typically held in place through adjacent holes and rivets.

To reduce part count and installation time, rivetless nut plates may be utilized. Rivetless nut plates rely on friction to resist rotation in the hole. In composite materials, obtaining sufficient interference to resist rotation while not causing inconsistencies to the composite material may be difficult.

Therefore, it would be desirable to have a method and apparatus that takes into account at least some of the issues discussed above, as well as other possible issues.

SUMMARY

An illustrative embodiment of the present disclosure provides an apparatus comprising a body and a flange. The body has a channel extending from a first end of the body to a second end of the body. The channel has a circular cross-section configured to receive a first fastener, and the body has an outer surface that has a noncircular cross-section. The flange is associated with the second end. The flange is configured to hold a second fastener.

Another illustrative embodiment comprises a fastener system. The fastener system comprises a nut plate having a body and a flange. The body has a channel extending from a first end of the body to a second end of the body. The channel has a circular cross-section and, the body has an outer surface having a noncircular cross-section. The flange is associated with the second end of the body.

Yet another illustrative embodiment provides a method for fastening structures. A first end of a body is placed into a hole on a first side of the structures. The body has an outer surface with a noncircular cross-section. A nut element is positioned on a flange at a second end of the body. A bolt is moved into a channel at the first end of the body towards the nut element on the flange on the second end of the body on the first side of the structures. The bolt and the nut element are fastened to each other.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that structures may be connected to each other using nut plates. The illustrative embodiments, however, recognize and take into account that with composite structures, the use of nut plates may be more difficult than desired.

One solution may involve using nut plates that are held in place using rivets. The nut plate may have holes to receive rivets that may be placed into structures.

Use of rivets, however, may be undesirable. For example, the use of rivets requires additional holes to be formed in a composite structure. The formation of additional holes increases the chances that an inconsistency may occur. Additionally, the formation of additional holes requires more time and equipment. Further, the use of rivets may also increase the weight of the structure more than desired. Also, the nut plates that use rivets may not provide a desired spacing between fasteners.

The illustrative embodiments also recognize and take account that a gang channel may be used in place of rivets. A gang channel is a device that connects multiple nut elements together. The use of gang channels may also be impractical if a limited number of nut elements are being applied, or if the pattern of nut elements applied is irregular to the form of the gang channel. The use of gang channels also requires time to apply and adds additional costs, making them inefficient to use in some situations.

Thus, the illustrative embodiments provide a method and apparatus for fastening structures. In one illustrative example, an apparatus comprises a body and a flange. The body has a channel extending from a first end of the body to a second end of the body. The channel has a circular cross-section configured to receive a first fastener, and the body has an outer surface that has a noncircular cross-section. The flange is associated with the second end. The flange is configured to hold a second fastener. In these illustrative examples, the first fastener may be a bolt and the second fastener may be a nut element.

Figure 1:
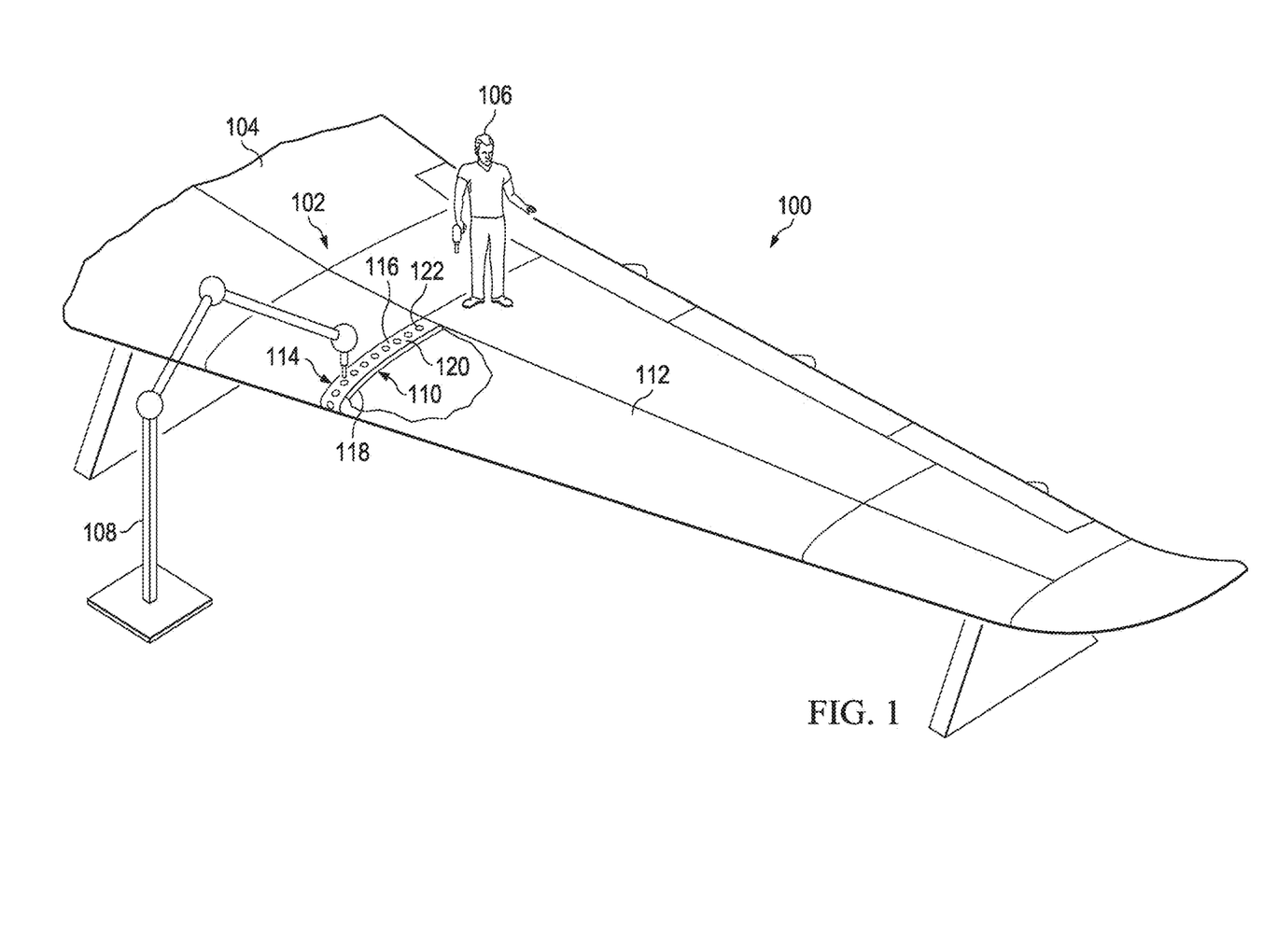
FIG. 1 is an illustration of a manufacturing environment in accordance with an illustrative embodiment.

With reference now to the figures and, in particular, with reference to FIG. 1, an illustration of a manufacturing environment is depicted in accordance with an illustrative embodiment. As depicted, manufacturing environment 100 is an environment in which an assembly of structures 102 for wing 104 is performed.

In this illustrative example, operator 106 and operator 108 connect structures 102 to each other within wing 104. As depicted, structures 102 include leading edge rib 110 and leading edge skin panel 112.

Leading edge skin panel 112 may be connected to leading edge rib 110 through the use of fastener systems 114 installed by operator 106 and operator 108. As depicted, operator 106 is a human operator. Operator 108 is a robotic arm.

In this illustrative example, structures 102 have first side 116 and second side 118. Access to second side 118 may be more difficult or unavailable in this illustrative example. As a result, nut plates may be used to reduce or avoid the need for access to second side 118 when installing fasteners to connect leading edge skin panel 112 to leading edge rib 110.

In these illustrative examples, at least one of leading edge rib 110 or leading edge skin panel 112 may be comprised of composite materials. As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list, but not all of the items in the list are required.

In the illustrative examples, a composite material is formed from two more constituents with different physical or chemical properties. For example, a matrix of resin may be mixed with the reinforcement of fibers to form a composite material. The resin may be, for example, a polyester resin, a vinyl ester resin, an epoxy resin, a shape memory polymer, and other suitable types of resins. The fibers may be, for example, carbon fibers, glass fibers, polymer fibers, and other suitable types of fibers. These components may be cured to form a rigid material. The structure formed from this and other types of composite materials may be referred to as a composite structure.

Figure 3:
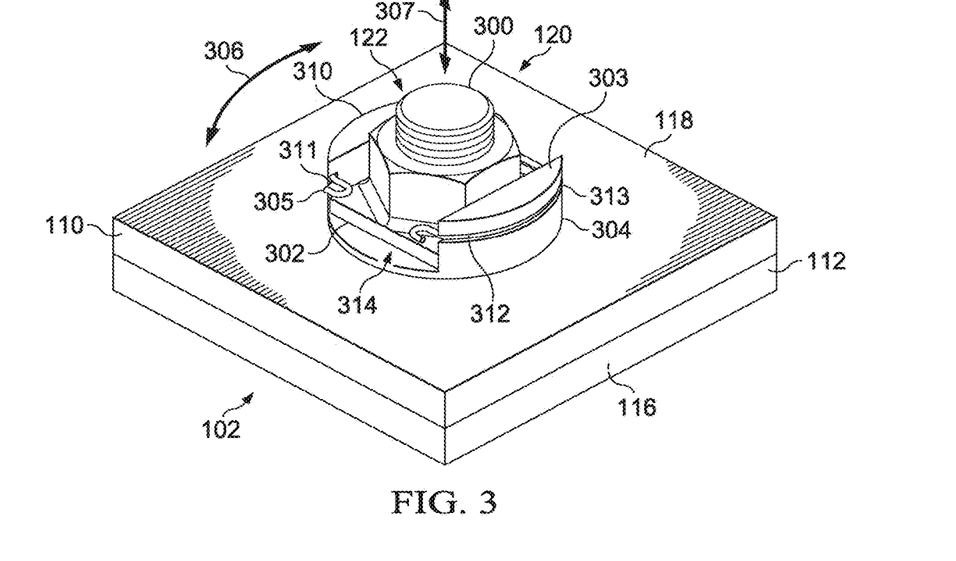
FIG. 3 is an illustration of a section of structures with a fastener system in accordance with an illustrative embodiment.

As depicted, fastener systems 114 may be implemented in accordance with an illustrative embodiment such that access to second side 118 may be reduced or inaccessible. Further, fastener systems 114, when implemented in accordance with an illustrative embodiment, may be installed more easily than with currently used fastener systems. Additionally, fastener systems 114, when implemented in accordance with an illustrative embodiment, may reduce the occurrence of inconsistencies when at least one of leading edge rib 110 or leading edge skin panel 112 are composite structures comprised of composite materials. A more detailed illustration of section 120 with fastener system 122 in fastener systems 114 is shown in FIG. 3.

The illustration of wing 104 in manufacturing environment 100 is not meant to limit the manner in which different illustrative embodiments may be implemented. For example, fastener systems 114 may be implemented in other types of structures 102 for other types of platforms.

For example, structures 102 may be for a monument, a landing gear assembly, an engine, a wing, a wall, furniture, and other suitable structures. In these illustrative examples, structures 102 may be a platform selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, a building, and other suitable types of platforms.

Figure 2:
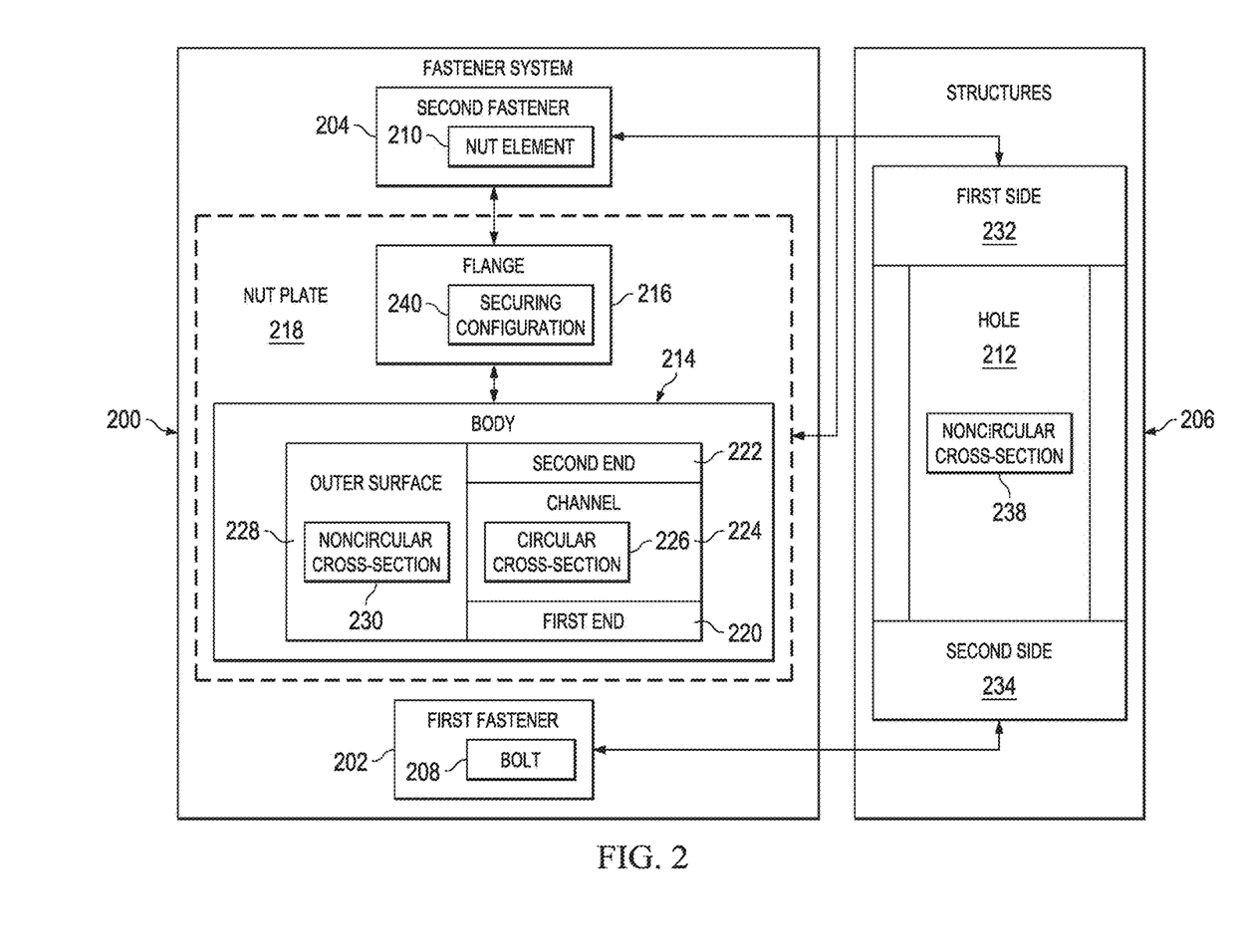
FIG. 2 is an illustration of a fastener system in accordance with an illustrative embodiment.

With reference now to FIG. 2, an illustration of a fastener system is depicted in accordance with an illustrative embodiment. Fastener system 200 is an example of a fastener that may be used in fastener systems 114 to connect structures to each other, such as leading edge skin panel 112 to leading edge rib 110 in FIG. 1.

In this illustrative example, fastener system 200 comprises first fastener 202 and second fastener 204. First fastener 202 and second fastener 204 may be used to connect structures 206 to each other. In these illustrative examples, first fastener 202 may be bolt 208 and second fastener 204 may be nut element 210. Bolt 208 and nut element 210 are configured to engage each other. This engagement may occur when a torque is applied to at least one of bolt 208 and nut element 210.

As depicted, structures 206 are two or more structures. The structures may include at least one composite structure in the illustrative examples. As depicted, hole 212 extends through structures 206.

As depicted, fastener system 200 also may include body 214 and flange 216. These two components may take the form of nut plate 218 in these illustrative examples.

Body 214 has first end 220 and second end 222. Body 214 has channel 224 extending from first end 220 to second end 222 of body 214. Additionally, channel 224 has circular cross-section 226. Circular cross-section 226 is substantially circular in these illustrative examples. In particular, circular cross-section 226 is configured to receive first fastener 202. Thus, some deviations may be present from a perfect circle for circular cross-section 226. These deviations may be specified by tolerance based on first fastener 202. In other words, the tolerance may specify that a deviation from a perfect circle may be such that channel 224 is able to receive first fastener 202 in the form of bolt 208 such that bolt 208 may engage second fastener 204 in the form of nut element 210 in this illustrative example.

As depicted, body 214 has outer surface 228 with noncircular cross-section 230. In other words, the cross-section of outer surface 228 has a different shape from the cross-section of channel 224 extending through body 214 in these illustrative examples. Noncircular cross-section 230 is a substantially noncircular cross-section in these illustrative examples. In the illustrative example, noncircular cross-section 230 may take various forms. For example, noncircular cross-section 230 may be a cross-section having a shape selected from one of an ellipse, an egg shape, an oval, a tri-oval, a trefoil, a curvilinear triangle, a teardrop, a quatrefoil, a rounded corner parallelogram, a pentagon, a hexagon, a heptagon, an octagon, a nonagon, a decagon, or some other suitable shape.

Flange 216 is configured to hold second fastener 204, such as nut element 210. As depicted, flange 216 is associated with body 214 at second end 222 of body 214. When one component is "associated" with another component, the association is a physical association in the depicted examples. For example, a first component, flange 216, may be considered to be associated with a second component, body 214, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In the different illustrative examples, flange 216 may be, for example, formed as part of second end 222 of body 214. In other illustrative examples, flange 216 may be a separate structure from body 214 and may be configured to be connected to second end 222 of body 214. Further, flange 216 may be removably connected to second end 222 of body 214 in some illustrative examples.

In these illustrative examples, structures 206 are arranged in a stack up. Hole 212 extends from first side 232 of structures 206 to second side 234 of structures 206.

First end 220 of body 214 may be placed into hole 212 on first side 232 of structures 206. The placement of body 214 with flange 216 associated with body 214 results in flange 216 being located on first side 232 of structures 206. In this illustrative example, hole 212 also has noncircular cross-section 238. Noncircular cross-section 238 is substantially the same shape as noncircular cross-section 230. Noncircular cross-section 230 may be slightly smaller. Noncircular cross-section 230 of outer surface 228 is selected such that an interference fit may still result between body 214 and hole 212 through additional processes, such as cold working.

Noncircular cross-section 230 of body 214 corresponding to noncircular cross-section 238 of hole 212 may reduce movement, such as rotation, of nut plate 218 within hole 212. This reduction in movement may occur when a force, such as a torque, is applied to at least one of bolt 208 or nut element 210.

With this type of cross-section, the interference fit may not need to be as tight as in other situations. As a result, the generation of inconsistencies in hole 212, structures 206, or both from installing nut plate 218 in hole 212 may be reduced. Further, the particular shape of noncircular cross-section 230 may be selected such that the creation of inconsistencies in hole 212, structures 206, or both from tightening at least one of bolt 208 or nut element 210 to connect structures 206 to each other may be reduced.

As depicted, body 214 may be comprised of a first material selected from at least one of a metal, a plastic, steel, aluminum, titanium, copper, polycarbonate, a composite material, or some other suitable material. Flange 216 is comprised of a second material selected from one of a metal, a plastic, steel, aluminum, titanium, copper, polycarbonate, a composite material, or some other suitable material. Body 214 and flange 216 may be comprised of the same material or different material in these illustrative examples.

Nut element 210 may be placed on flange 216. In these illustrative examples, flange 216 may have securing configuration 240. Securing configuration 240 is a shape of flange 216 that allows flange 216 to hold nut element 210 for various orientations of structures 206. For example, first side 232 may be substantially vertical, substantially horizontal to the floor, or some other orientation. With these different orientations, flange 216 may hold nut element 210 in place for engagement with bolt 208.

As depicted, bolt 208 may be moved into hole 212 from second side 234 to structures 206. This movement of bolt 208 results in bolt 208 moving into channel 224 from first end 220 of body 214. The movement of bolt 208 may be such that bolt 208 may be engaged with nut element 210 held by flange 216. This positioning may be such that nut element 210 and bolt 208 may be engaged with each other through the use of force to rotate bolt 208 in a manner that secures bolt 208 to nut element 210. As a result, structures 206 are connected to each other.

The illustration of fastener system 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in other illustrative examples, flange 216 may be configured to hold bolt 208 in place. In this example, nut element 210 may be turned to engage bolt 208 in a manner that secures structures 206 to each other.

With reference now to FIG. 3, an illustration of a section of structures with a fastener system is depicted in accordance with an illustrative embodiment. In this illustrative example, a more detailed illustration of section 120 of structures 102 with fastener system 122 is depicted in accordance with an illustrative embodiment. In this illustrative example, an isometric view of section 120 is shown.

As seen in this illustrative example, fastener system 122 includes a number of components. As depicted, fastener system 122 includes bolt 300, nut element 302, nut plate 303, and retention device 305.

Bolt 300 is an example of a physical implementation for bolt 208 shown in block form in FIG. 2. Nut element 302 is an example of a physical implementation for nut element 210 shown in block form in FIG. 2.

Flange 304 is a component of nut plate 303 in this example. As depicted, flange 304 is an example of one physical implementation for flange 216 shown in block form in FIG. 2. Flange 304 has a configuration that is configured to maintain a position of nut element 302 when force is applied to bolt 300 in the direction of arrow 306. Additionally, retention device 305 may resist movement in the direction of arrow 307. Additionally, a body is another component of nut plate 303 but not seen in this view.

In this illustrative example, flange 304 has wall 310 and wall 312 that defines channel 314.

Nut element 302 may be placed into and held within channel 314. Retention device 305 is configured to hold nut element 302 within channel 314. In this illustrative example, retention device 305 takes the form of a retention clip and may be placed into groove 311 and groove 313 in flange 304.

As depicted, wall 310 and wall 312 of flange 304 is configured to reduce or prevent rotation of nut element 302 when bolt 300 is rotated to engage nut element 302 and connect structures 102 to each other.

Figure 4:
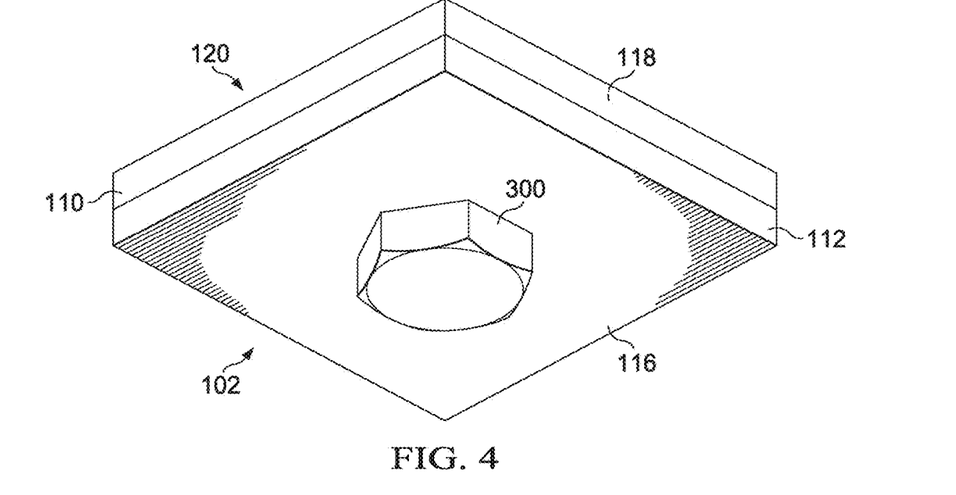
FIG. 4 is another illustration of a section of structures with a fastener system in accordance with an illustrative embodiment.

With reference next to FIG. 4, another illustration of a section of structures with a fastener system is depicted in accordance with an illustrative embodiment. In this view, another isometric view of section 120 is shown. Bolt 300 can be seen in this view. Bolt 300 extends from first side 116 to second side 118 to engage nut element 302.

Figure 5:
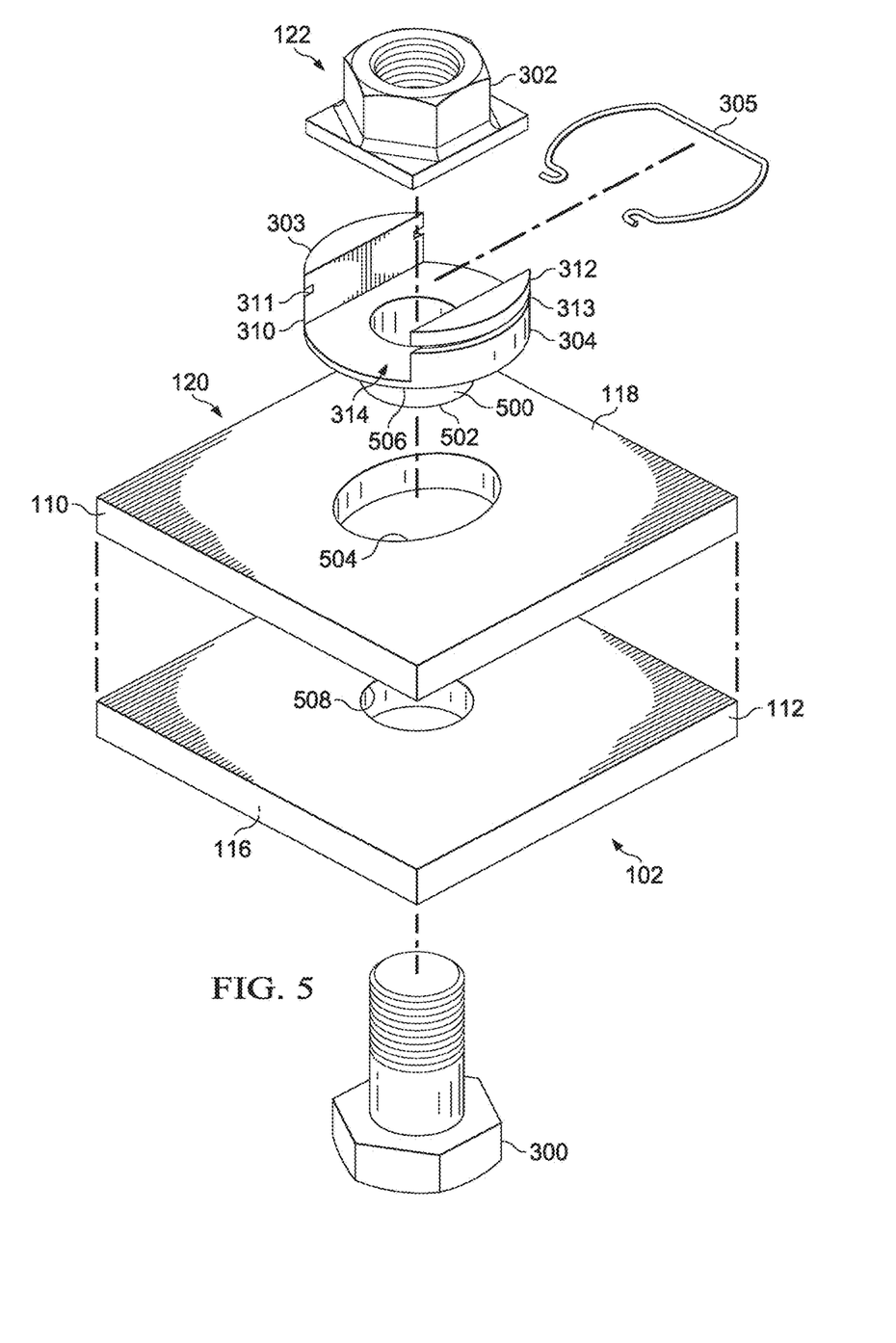
FIG. 5 is an exploded view of a section of structures with a fastener system in accordance with an illustrative embodiment.

With reference now to FIG. 5, an exploded view of a section of structures with a fastener system is depicted in accordance with an illustrative embodiment. In this exploded view of section 120, body 500 is seen.

In this illustrative example, body 500 has first end 502 that may extend into noncircular hole 504 on second side 118 of structures 102 when body 500 is placed into noncircular hole 504. In particular, first end 502 may extend into the portion of noncircular hole 504 in leading edge rib 110. In this illustrative example, first end 502 has a noncircular shape. As depicted, flange 304 is connected to second end 506 of body 500. Hole 508 in leading edge skin panel 112 is circular. Hole 508 does not need to be noncircular because body 500 is not inserted into hole 508 in this example. Instead, hole 508 may receive bolt 300.

Figure 6:
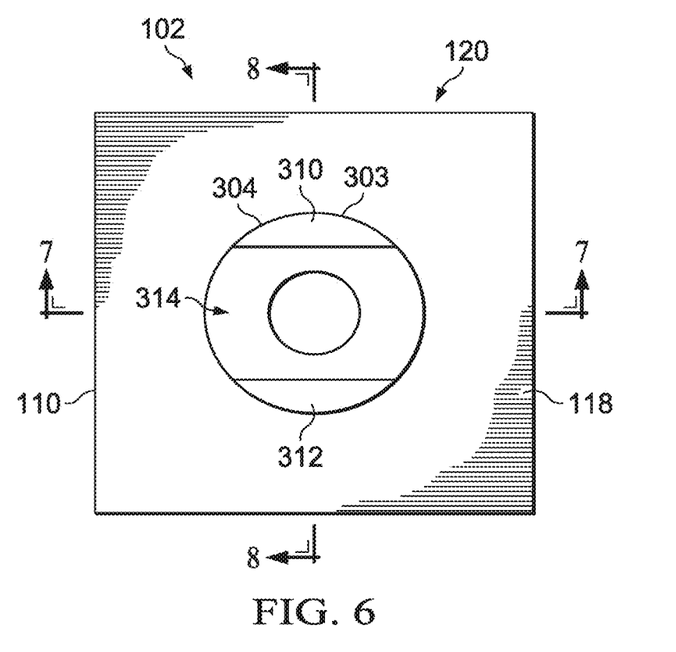
FIG. 6 is an illustration of a top view of a section of structures with a fastener system in accordance with an illustrative embodiment.

With reference next to FIG. 6, an illustration of a top view of a section of structures with a fastener system is depicted in accordance with an illustrative embodiment. In this example, the top view is a view of second side 118 of structures 102. In this depicted view, nut plate 303 is shown without bolt 300 and nut element 302.

Figure 7:
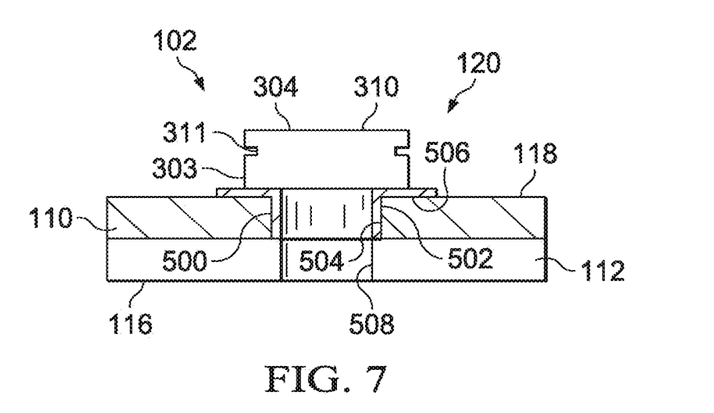
FIG. 7 is an illustration of a cross-sectional view of structures and a nut plate in accordance with an illustrative embodiment.

Turning now to FIG. 7, an illustration of a cross-sectional view of structures and a nut plate is depicted in accordance with an illustrative embodiment. The cross-sectional view of structures 102 with nut plate 303 is shown taken along lines 7-7 in FIG. 6.

Figure 8:
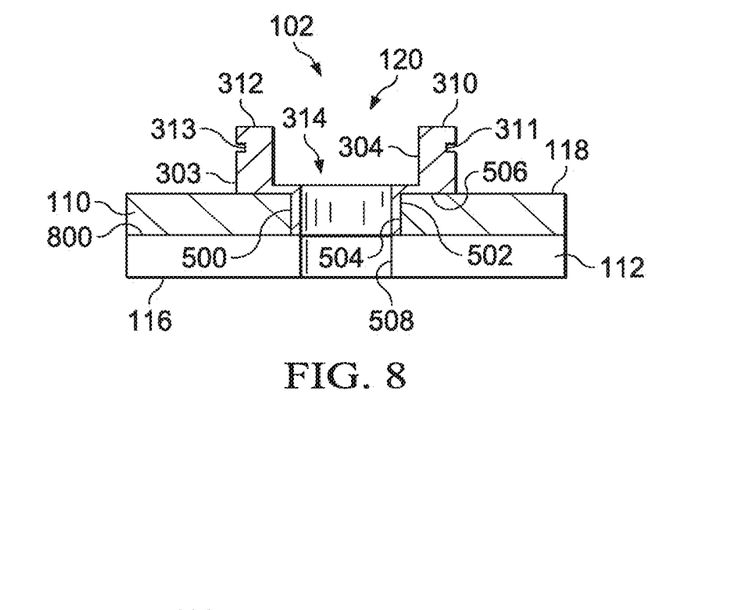
FIG. 8 is another illustration of a cross-sectional view of structures and a nut plate in accordance with an illustrative embodiment.

Next in FIG. 8, another illustration of a cross-sectional view of structures and a nut plate is depicted in accordance with an illustrative embodiment. The cross-sectional view of structures 102 with nut plate 303 are shown taken along lines 8-8 in FIG. 6. A view of outer side 800 is shown and described with reference to FIG. 9 below.

Figure 9:
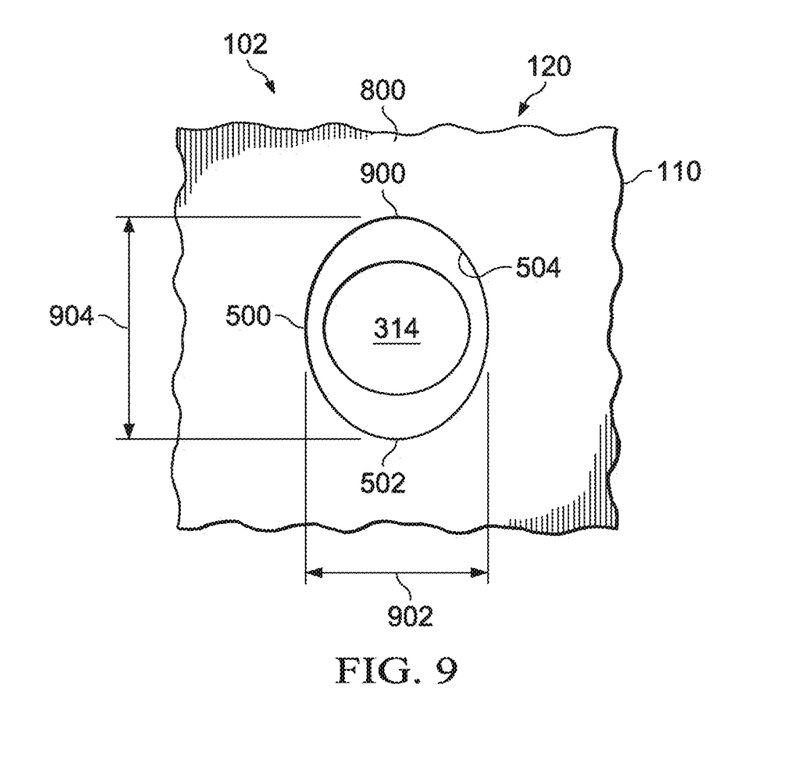
FIG. 9 is an illustration of an outer side of a structure with a body of a nut plate in accordance with an illustrative embodiment.

In FIG. 9, an illustration of an outer side of a structure with a body of a nut plate is depicted in accordance with an illustrative embodiment. In this view of outer side 800 of leading edge rib 110, first end 502 of body 500 also is seen within noncircular hole 504. In this illustrative example, channel 314 has a circular cross-section. As depicted, channel 314 is configured to receive bolt 300.

As depicted, body 500 has exterior wall 900. Exterior wall 900 has a noncircular cross-section in this illustrative example. For example, dimension 902 may be about 0.300 inches, while dimension 904 may be about 0.305 inches in this illustrative example. The noncircular cross-section of exterior wall 900 corresponds to the shape of noncircular hole 504. In other words, noncircular hole 504 also has a noncircular cross-section.

Figure 10:
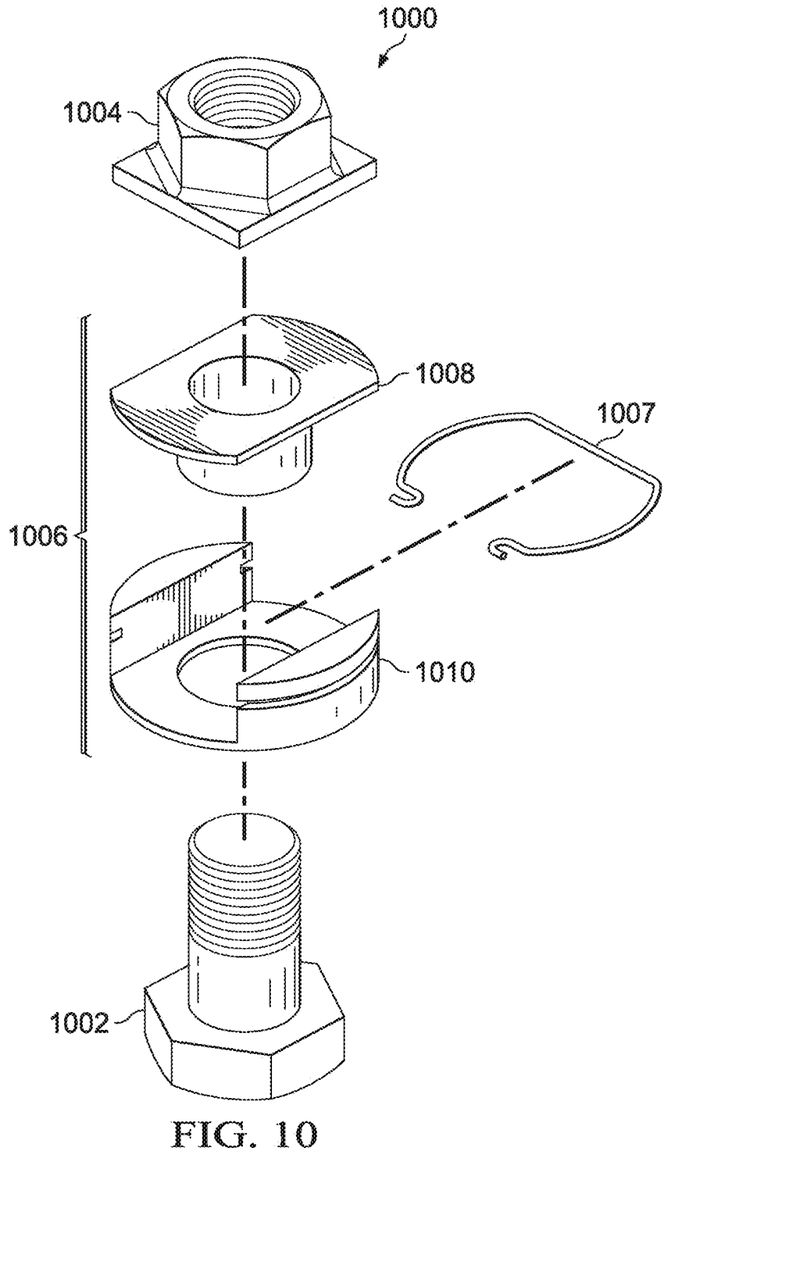
FIG. 10 is an illustration of a fastener system in accordance with an illustrative embodiment.

With reference next to FIG. 10, an illustration of a fastener system is depicted in accordance with an illustrative embodiment. In this depicted example, fastener system 1000 includes bolt 1002, nut element 1004, nut plate 1006, and retention device 1007.

In this illustrative example, nut plate 1006 includes body 1008 and flange 1010. As depicted, body 1008 and flange 1010 are separate pieces. These two pieces may be connected to each other prior to bolt 1002 and nut element 1004 engaging each other.

Figure 11:
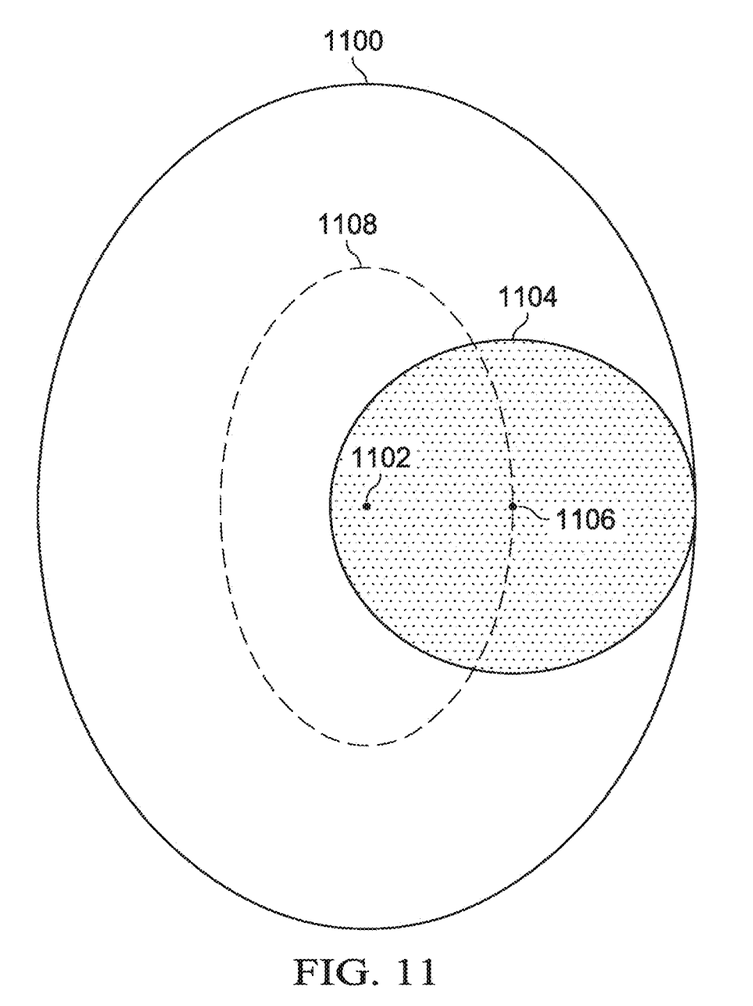
FIG. 11 is an illustration of a hole in accordance with an illustrative embodiment.

Turning now to FIG. 11, an illustration of a hole is depicted in accordance with an illustrative embodiment. In this illustrative embodiment, hole 1100 may be an example of one implementation for noncircular hole 504 in FIG. 5. As depicted, hole 1100 has a noncircular shape. The noncircular shape of hole 1100 corresponds to the noncircular shape of a nut plate in accordance with an illustrative embodiment. For example, the noncircular shape is an elliptical cross-section in this illustrative example.

As depicted, hole 1100 has center 1102. Similarly, cutter 1104 has center 1106. Center 1106 of cutter 1104 is offset from center 1102 of hole 1100 in this illustrative example. Path 1108 may be formed using the offset of center 1106 of cutter 1104 to center 1102 of hole 1100. In these illustrative examples, the offset varies such that path 1108 has an elliptical shape. In other examples, path 1108 may have another shape. In order to form hole 1100, center 1106 of cutter 1104 moves along path 1108. In this manner, cutter 1104 may create hole 1100. As depicted, hole 1100 may be created to correspond to and receive an outer surface with a noncircular cross-section in a body of a nut plate, such as nut plate 303.

The illustration of the fastener systems in FIGS. 3-11 are only provided as examples of some implementations that may be used in accordance with an illustrative embodiment. Other illustrative examples may have other shapes for the different components illustrated.

The different components shown in FIGS. 1 and 3-11 may be combined with components in FIG. 2, used with components in FIG. 2, or a combination of the two. Additionally, some of the components in FIGS. 1 and 3-11 may be illustrative examples of how components shown in block form in FIG. 2 can be implemented as physical structures. For example, other methods may be used for creating hole 1100. For example, laser drilling, electric discharge machining, and other processes may be implemented.

Figure 12:
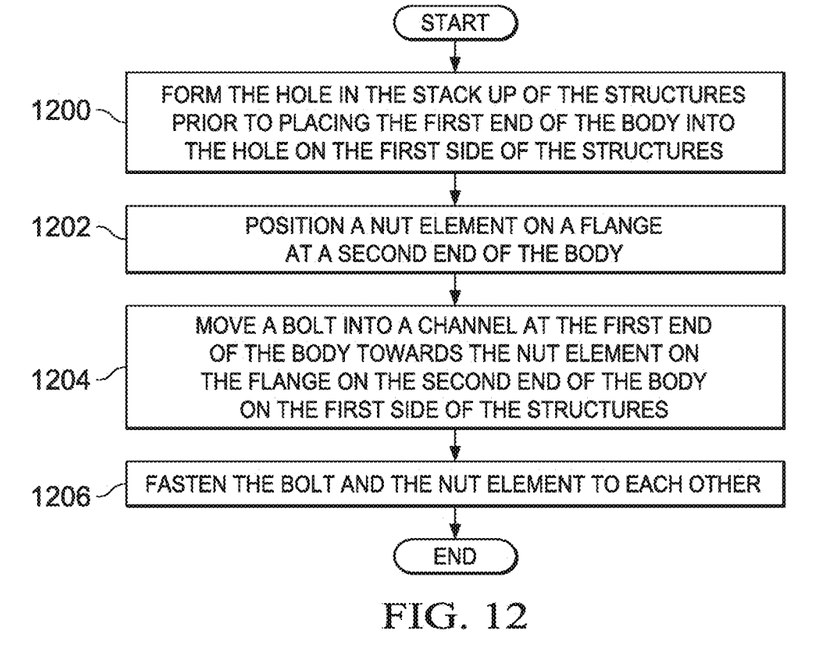
FIG. 12 is an illustration of a flowchart of a process for fastening structures in accordance with an illustrative embodiment.

Turning next to FIG. 12, an illustration of a flowchart of a process for fastening structures is depicted in accordance with an illustrative embodiment. The process illustrated FIG. 12 may be implemented in a manufacturing environment, such as manufacturing environment 100 in FIG. 1, to connect structures to each other. In particular, the structures may be connected to each other using fastener system 200 in FIG. 2.

The process begins by forming the hole in the stack up of the structures prior to placing the first end of the body into the hole on the first side of the structures (operation 1200). In operation 1200, some holes in the stack up of structures may be circular while other holes may be noncircular. The circular holes are for structures through which the body of a nut plate is received in this illustrative example. The body has an outer surface with a noncircular cross-section. In the illustrative example, only one structure may be noncircular while the other structures in the stack up are circular. The circular holes in the structures are configured to receive a bolt in this illustrative example. The noncircular hole may be formed separately from the circular holes.

A nut element is positioned on a flange at a second end of the body (operation 1202). A process similar to cold working is used to install the nutplate into the rib with a slight interference level. The process then moves a bolt into a channel at the first end of the body towards the nut element on the flange on the second end of the body on the first side of the structures (operation 1204).

The bolt and the nut element are fastened to each other (operation 1206), with the process terminating thereafter. The bolt and the nut element are fastened to each other by applying a force, such as a torque, to the bolt while the nut element is held by the flange. As a result the structures are fastened to each other.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 13:
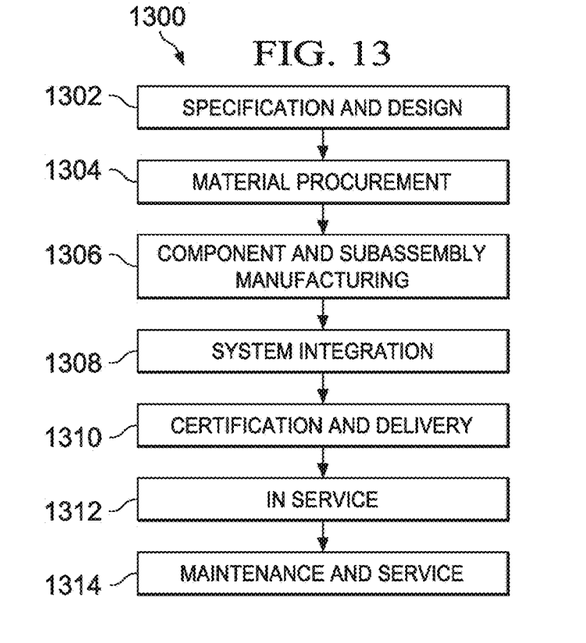
FIG. 13 is an illustration of a block diagram of an aircraft manufacturing and service method in accordance with an illustrative embodiment.
Figure 14:
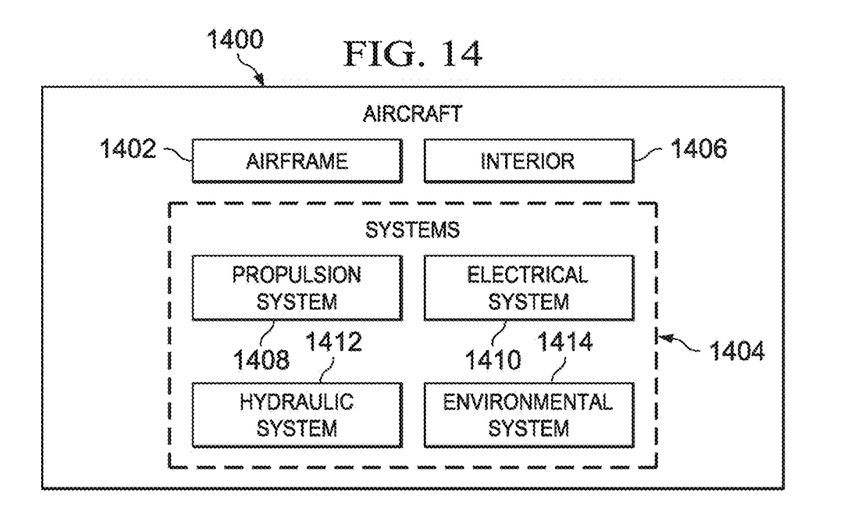
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. The different illustrative examples may be implemented in component and subassembly manufacturing 1306 to connect structures to each other to form assemblies. Further, the illustrative examples also may be used during system integration 1308 with assembling aircraft 1400. Illustrative embodiments also may be used during maintenance and service 1314. The illustrative embodiments may be used to connect structures to each other during maintenance, refurbishment, upgrades, and other operations. The use of a number of the different illustrative embodiments may substantially expedite the assembly of and/or reduce the cost of aircraft 1400.

The illustrative embodiments provide a method for connecting structures to each other using fastener systems. In the illustrative examples, the nut plate has a body that has an exterior surface that has a noncircular cross-section. Although an ellipse, the depicted shape of the noncircular cross-section, has been shown in the illustrative examples, other shapes may be used other than an elliptical cross-section such that the shapes allow for increased resistance to rotation of the body of the nut plate within the hole when a torque is applied to tighten a bolt to a nut element installed in the hole and nut plate. In this manner, cold working may be used to create a slight interference fit to secure the nut plate to the composite structure. With the use of the nut plate, the number of holes formed in composite structures may be reduced when rivets are unnecessary. Further, weight caused by the use of other types of techniques, such as those using gang channels, may be avoided. Of course, the different illustrative embodiments may be applied to other types of structures other than composite structures. For example, the illustrative embodiments may be applied to metal, plastic, and other structures that employ other types of materials.

The different illustrative embodiments may be applied in a number of different ways. For example, the fastener system may be employed by at least one of a human operator, automated equipment, equipment controlled by human operators, or other suitable types of operators.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fastening structures using a body, a nut element, and a bolt, the method comprising:
   placing a first end of the body into a hole in the structures, wherein:
      the first end of the body is placed into the hole at a first side of the structures,
      the body comprises an outer surface, having a noncircular cross-section, and a channel at the first end of the body, and
      the noncircular cross-section of the body is placed into the hole in the structures;
   positioning the nut element on a flange of the body,
      wherein the flange is positioned at a second end of the body and comprises parallel walls forming a flange channel,
      wherein the nut element is positioned within the flange channel;
   positioning a retention device onto the flange, wherein the retention device supports the nut element within the flange channel;
   moving the bolt into the channel of the body toward the nut element, while the nut element is positioned on the flange; and
   fastening the bolt and the nut element to each other,
      wherein the structures are fastened to each other once the bolt and the nut element are fastened together.

2. The method of claim 1, further comprising forming the hole in the structures, wherein the hole is formed prior to placing the first end of the body into the hole on the first side of the structures.

3. The method of claim 1, wherein fastening the bolt and the nut element to each other comprises applying a torque to the bolt while the nut element is supported by the flange.

4. The method of claim 1, further comprising connecting the flange to the second end of the body.

5. The method of claim 4, wherein the flange comprises a first material, and the body comprise a second material, different from the first material.

6. The method of claim 5,
   wherein the first material is selected from the group consisting of a metal, a plastic, steel, aluminum, titanium, copper, polycarbonate, and a composite material, and
   wherein the second material is selected from the group consisting of a metal, a plastic, steel, aluminum, titanium, copper, polycarbonate, and a composite material.

7. The method of claim 1, wherein the structures comprise at least one composite structure.

8. The method of claim 1, wherein the structures are parts of a platform selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, and a building.

9. The method of claim 1, wherein the hole is a non-circular hole at the first side of the structures.

10. The method of claim 9, wherein the hole is a circular hole at a second side of the structures, opposite to the first side.

11. The method of claim 10, wherein the circular hole is concentric with the non-circular hole.

12. The method of claim 1, wherein the channel at the first end of the body is circular.

13. The method of claim 1, wherein the body is not rotatable relative to the structures while the bolt and the nut element are fastened to each other.

14. The method of claim 13, wherein the body is not rotatable relative to the nut element while the bolt and the nut element are fastened to each other.

15. The method of claim 14, wherein the flange at the second end of the body engages the nut element to prevent rotation of the nut element relative to the body.

16. The method of claim 1, wherein the flange and the body are monolithic.

17. The method of claim 1, wherein:
   the flange comprises a first material and the body comprise a second material, and
   the first material and the second material are identical to each other.

18. The method of claim 1, wherein placing the first end of the body into the hole on the first side of the structures comprises interference fitting the first end into the hole.

19. The method of claim 1, wherein:
   the retention device is a retention clip,
   the flange comprises a groove; and
   positioning the retention device onto the flange comprises positioning the retention clip not the groove.

20. The method of claim 1, wherein the noncircular cross-section of the outer surface of the body has a shape selected from one of an ellipse, an egg shape, an oval, a tri-oval, a trefoil, a curvilinear triangle, a teardrop, a quatrefoil, a rounded corner parallelogram, a pentagon, a hexagon, a heptagon, an octagon, a nonagon, or a decagon.

* * * * *